Figure 1:
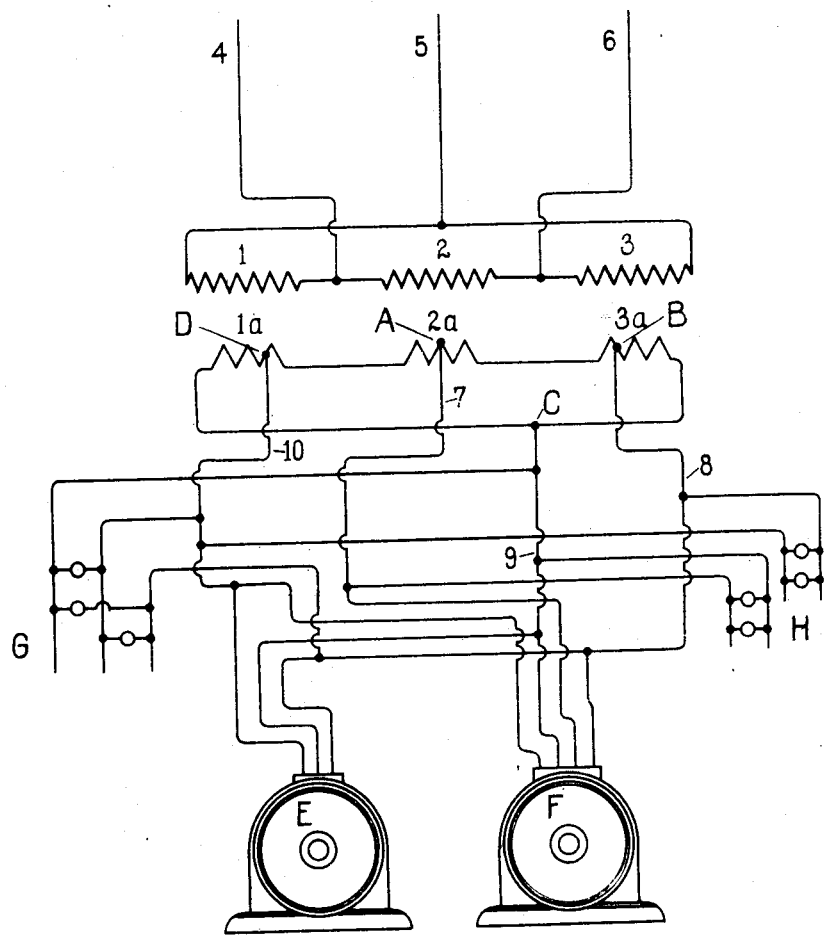

No. 869,595. PATENTED OCT. 29, 1907.
W. T. TAYLOR.
TRANSFORMATION OF ELECTRIC CURRENTS.
APPLICATION FILED MAR. 14, 1907.

2 SHEETS—SHEET 1.

WITNESSES:
E. J. Bernstein.
Leonard H. Wolff.

INVENTOR
W. T. Taylor
BY
Edward P. Thompson
ATTORNEY

UNITED STATES PATENT OFFICE.

WILLIAM T. TAYLOR, OF CHIHUAHUA, MEXICO.

TRANSFORMATION OF ELECTRIC CURRENTS.

No. 869,595.  Specification of Letters Patent.  Patented Oct. 29, 1907.

Application filed March 14, 1907. Serial No. 362,266.

*To all whom it may concern:*

Be it known that I, WILLIAM T. TAYLOR, a citizen of the United States of America, and a resident of Chihuahua, in the county of Chihuahua and country of Mexico, have invented certain new and useful Improvements in the Transformation of Electric Currents, of which the following is a specification.

The object of this invention is to meet a problem which frequently arises in the distribution of electric energy by means of polyphase currents. It frequently happens that two-phase and three phase apparatus are found together upon the same system, as for example where two previously independent systems of distribution are consolidated, or where an installation of three-phase apparatus is changed from a three-phase to a two-phase system of supply or the reverse. In such cases, according to practice as hitherto followed, one of two courses must be taken: Either there must be two separate sets of distribution wires, one for three-phase and the other for two-phase currents, or else the one general set of distribution wires for one system, and a special transformer or set of transformers at every point where there is a piece or group of apparatus adapted for the other system, to form a special secondary distribution system adapted thereto.

According to my invention I am enabled to derive both two-phase and three-phase currents from a single set of four distribution wires from which either two-phase or three-phase currents may be tapped as desired;
and further, according to the most improved form or mode of carrying out the invention, the phases in each system are evenly balanced, and the drawing of current of one kind from the system cannot unbalance it with respect to currents of the other kind.
My invention consists, generally speaking, in arranging an electrically energized three-phase transformer or system of transformers with a set of four peculiarly disposed taps, in such manner that three of said taps taken together form a complete and perfect three-phase system of wires, while the four taken in alternate pairs form together a complete and perfect two-phase system of wires.

My invention can best be understood from a contemplation of the accompanying drawings taken in connection with the following description thereof.

Figure 2:
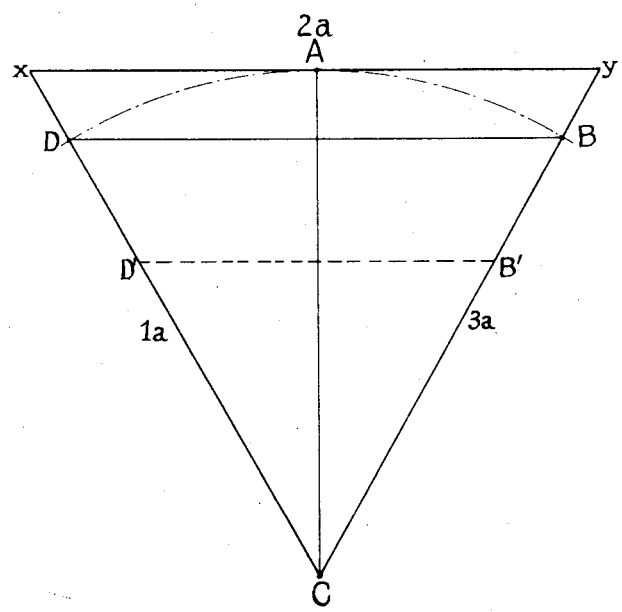

In these drawings Figure 1 shows diagrammatically a scheme of the system of connections, and Fig. 2 is a vector diagram for illustrating the phase relations geometrically.
In Fig. 1 there is shown a primary transformer or transformer system for three-phase currents, composed of the three primary coils 1, 2, and 3, connected in delta (though not necessarily so) and the three secondary coils, $1^a$, $2^a$, and $3^a$, likewise connected in delta.
The primary of this transformer or transformer system is supplied with electric energy from a suitable source by means of current-leads 4, 5, and 6. It will be understood of course that the relative phase-angle between the impressed electromotive forces in the several coils 1 and 2, 2 and 3, and 1 and 3, of the transformer is in each case 120 degrees of arc, and correspondingly the phase-angle between the impressed electromotive forces in the secondary coils $1^a$ and $2^a$, $2^a$ and $3^a$, and $1^a$ and $3^a$, will also be in each case 120 degrees of arc.

From the system $1^a$; $2^a$, and $3^a$ a set of four leads 7, 8, 9, and 10, are tapped at the points A, B, C, and D respectively. These points are located as follows: the point A in the center of any of the three coils, say the coil $2^a$, and the point C at the junction between the other two coils, $1^a$ and $3^a$; the points B and D at intermediate points between the ends of the coils $3^a$ and $1^a$ respectively at equal distances electrically speaking from the point A, that is, from the respective ends of the coil $2^a$. So taken, the points B and D are likewise at equal electrical distances from the point C, since the coils $1^a$ and $3^a$ are electrically equal, that is designed to produce electromotive forces of equal magnitude. As thus located, the three leads B, C, and D form a three-phase system, the electromotive forces between which will be equal and at equal phase angles of 120 degrees each; and they may be tapped by any suitable translating devices adapted to that system, such as three-phase motors E and lamps G. Also the four leads A, B; C and D taken together in the pairs AC and BD form together a two-phase system having phase relations between the two pairs of 90 degrees, that is the electromotive force in the pair AC will be at right angles to that of the pair BD, and they may be tapped by any suitable translating devices such as two-phase motors F and lamps H equally divided between the two pairs of leads. In the two-phase system just described, however, the electromotive forces in the respective pairs, though at right angles, will not be of equal magnitude unless the following condition is complied with: the points B and D must each be taken at an electrical distance from the point C equal to $\sqrt{3}$ to 2 or 86.6% of the total electrical lengths of said coils; or in other words, the electromotive force generated between the point C and the points B and D respectively stands in each case in relation to the total electromotive forces generated by the coils $1^a$ and $3^a$ respectively in the ratio of $\sqrt{\frac{3}{2}}$ to 2. The reason for an explanation of this disposition may best be understood from a reference to the vector diagram, (Fig. 2). In this diagram the sides $Cx$, $xy$, and $yC$ of the equilateral triangle $Cxy$, represent respectively in magnitude and direction the magnitude and relative phase of the respective electromotive forces generated by the coils $1^a$, $2^a$, and $3^a$. The reference characters $1^a$, $2^a$, and $3^a$, which in Fig. 1 apply to the coils, in Fig. 2 are applied conveniently to represent the electromotive forces generated thereby. As in Fig. 1 the point A bisects the line $xy$ representing the electromotive force $2^a$, and the point C is at the junction of the electromotive forces $1^a$ and $3^a$; while the points B and D are intermediately situated upon the lines $1^a$ and $3^a$. If with the point C as a center and radius CA circular arc BAD, be drawn said arc will cut off from the lines Cx, Cy, (electromotive forces $1^a$ and $3^a$) portions CB, CD, thereof which will be equal in length to the line (electromotive force) CA; and further the line (electromotive force) BD, being the side of an equilateral triangle CBD, is also equal to the line (electromotive force) CA. Again, by a well-known geometrical theorem, the line (electromotive force) CA, being the median line of an equilateral triangle, is perpendicular to the line $xy$, and therefore to the line (electromotive force) BD, which is parallel to $xy$; therefore CA is perpendicular to BD, hence electromotive forces CA and BD, are at right angles to each other and equal in magnitude, and therefore form a true and equally balanced two-phase current-system.

It will be obvious that, wherever the points B and D be taken, provided they be at equal distances from the point C on the lines Cy and Cx, as for example at the points B' and D', the triangle CBD, or CB'D', will be an equilateral triangle; and therefore the three leads 8, 9, and 10 will always form together a correct and equally balanced three-phase system; and further that the electromotive forces CA, and BD, (or B' D') will in each case be at right angles to each other as regards phase, but will be of unequal magnitude unless the foregoing condition be complied with in which CB=CD=CA. Now it is well understood that the median of an equilateral triangle is to the side thereof as $\sqrt{3}$ to 2; hence it arises that CB is to $1^a$ also in the ratio of $\sqrt{3}$ to 2.

Of course the skilled electrician will readily devise modified forms and electrical equivalents of the special arrangement of connections here shown, and I therefore do not consider my invention limited by these further than is indicated by the reasonable scope of my claims.

Having thus described my invention, what I claim as new and desire to secure by Letters Patent is:

1. A composite polyphase system of distribution comprising a set of three inductive coils electrically energized with three-phase electromotive forces, and a set of four taps for distributing leads connected thereto, with the mutual electromotive forces between three of said taps being equal and at angles of 120 degrees of arc, and the mutual electromotive force between two of said taps being at right-angles to the mutual electromotive force between the other two of said taps.

2. A composite polyphase system of distribution comprising a set of three inductive coils electrically energized with three-phase electromotive forces, and a set of four taps for distributing leads connected thereto, the mutual electromotive forces between three of said taps being equal and at angles of 120 degrees of arc, and the mutual electromotive force between two of said taps being equal to and at right angles to the mutual electromotive force between the other two of said taps.

3. A composite polyphase system of distribution consisting of three equal inductive coils connected together in delta, means for energizing said coils by a three-phase electromotive force, and a system of four leads tapped from said coils three of which carry electromotive forces having a mutual phase-angle of 120 degrees, and two of which carry an electromotive force differing in phase-angle by 90 degrees from the electromotive force between the other two.

4. A composite polyphase system of distribution consisting of three equal inductive coils connected together in delta, means for energizing said coils by a three-phase electromotive force, and a system of four leads tapped from said coils three of which carry electromotive forces having a mutual phase-angle of 120 degrees, and two of which carry an electromotive force differing in phase-angle by 90 degrees from the electromotive force between the other two, the magnitude of the mutual electromotive force in the first pair being equal to that in the second pair.

5. A composite system of distribution for polyphase currents comprising a set of three inductive coils connected together in delta, means for generating three-phase electromotive forces within said coils, and a set of four current leads tapped to said coils as follows: the first lead at the junction of two of said coils, the second lead at the center of the third coil, and the third and fourth leads at intermediate points of the first two coils respectively.

6. A composite system of distribution for polyphase currents comprising a set of three inductive coils connected together in delta, means for generating three-phase electromotive forces within said coils, and a set of four current leads tapped to said coils as follows: the first lead at the junction of two of said coils, the second lead at the center of the third coil, and the third and fourth leads at intermediate points of the first two coils respectively, said intermediate points being so taken that they cut off between them and the first point a portion of their respective coils whose electromotive force is to the electromotive force of the whole coil as $\sqrt{3}$ to 2.

WILLIAM T. TAYLOR.

Witnesses:
D. G. FERNANDEZ,
JUAN R. CAMP.